Patented Sept. 9, 1952

2,610,117

UNITED STATES PATENT OFFICE 2,610,117

COMPOSITIONS AND METHOD FOR REDUCING THE LOSS OF CROP BY FROST DAMAGE TO FLOWERING PLANTS

Peter Paul Hopf, Orpington, and Geoffrey Leigh Hey, Luton, England, assignors to Ward Blenkinsop & Company Limited, London, England, a British company No Drawing. Application June 1, 1951, Serial No. 229,544

20 Claims. (Cl. 71—2.5)

This invention relates to the reduction of the loss of crop by frost damage to flowering plants, especially fruit-bearing trees and plants.

The objects of the invention include the provision of compositions containing a plurality of active ingredients which either as such or in conjunction with additional carriers may be applied to fruiting trees and plants which are liable to damage by frost during the flowering period: the provision of such compositions containing as active ingredients, a plant hormone, a substance having antipellagric activity and a substance having vitamin K activity: the provision of methods of treating fruiting trees at any stage from the breaking stage to the fruitlet stage so as to diminish the action of frost upon the ultimate yield of fruit and/or to produce better fruit and more especially of methods by which this can be achieved by conventional spraying and drilling techniques.

It is well known that fruit trees and plants growing in temperate climates are liable to serious risk of damage during the flowering period owing to the action of frost. The risk is especially great when the flowering buds develop early and is usually less when they come on late. However in temperate climates there is practically always some risk and fruit growers often suffer serious loss from spring frosts. The flowers are often affected and fail to develop and, if the fruitlet stage has been reached, the whole crop may fall within a week or two and the harvest will be a complete failure. Apple, pear, peach, plum, apricot and cherry are usually the most seriously affected fruits.

So far as we are aware no satisfactory method of countering or even of reducing the damage by frost has been proposed other than by the use of orchard heaters. Since, even in a successful season, the tree subsequently passes through one or more periods during which it discards a proportion of fruitlets or growing fruits, a method by which a proportion or a greater proportion of the flowers or fruitlets could be enabled to grow on to maturity would provide an acceptable solution to this harassing problem.

It has been observed that when fruit trees are sprayed in February, March and April with growth regulating substances commonly known as plant hormones at very low concentrations there is, in some cases, some reduction in the amount of damage inflicted by frost between the green bud stage of the buds and the fruitlet stage but particularly during the flowering period as compared with controls. This observation has been limited to a few varieties while other varieties, which might have been expected to behave similarly have yielded completely negative results. A similar phenomenon has been observed by us in a few cases with certain substances exhibiting vitamin K activity notably with the naphthoquinones and nicotinic acid and certain of its derivatives but in the case of the latter much higher concentrations are necessary.

Surprisingly we have found that much better and more economic results can be obtained if a plant hormone, one of the said substances exhibiting vitamin K activity and nicotinic acid or a functional derivative thereof are applied together to the trees preferably at the green bud stage, e. g., in April on apple in a normal season in Great Britain. In this way it has been found possible to reduce spring frost damage to flowering fruit trees in Great Britain by as much as 50%, and in same cases, even more. The use of the three materials gives a much better result than is represented by the arithmetic sum of their independent effects. The reason for this surprising result is not yet clear.

Accordingly, the present invention provides a composition for reducing the loss of crop by frost damage to a fruit bearing plant comprising, as the essential ingredients, a plant hormone, a substance having vitamin K activity and a substance having antipellagric activity. According to a feature of the invention the weight of the substance having vitamin K activity and the weight of the substance having plant hormone activity together is at least 5% of the active ingredients of the composition, the remainder being a substance having antipellagric activity.

The invention also provides the method of reducing the loss of crop by frost damage to a fruit bearing plant which comprises applying to the fruit bearing spurs of said plant at any time from the green bud stage to the fruitlet stage limited amounts of a plant hormone, a substance having vitamin K activity and a substance having antipellagric activity whereby normal development of an enhanced proportion of fruits takes place.

It is an important feature of the invention that normal or substantially normal development of the fruitlets to mature fruit takes place. That is to say the development should be substantially similar to that which experience would lead one to expect from spurs which had not been subject to the action of frost. The invention, in this aspect, is thus quite different from the known phenomenon of parthenocarpy and as will appear hereinafter, it enables crops to be obtained from varieties which yield negative results under the hitherto described practise of applying a plant hormone (or auxin) alone to the fruit bearing spurs. When little or no frost is encountered a finer crop is obtainable.

One important effect of the application of the mixtures in accordance with the invention to fruit trees is that the blooms carried on fruit trees, such as apple, pear, plum and cherry, exhibit a greater resistance to the action of frost. Thus it has been observed with certain varieties that when frost sufficiently severe to bring about substantially complete destruction of blossoms on untreated trees is encountered, 50–60% of the flowers on treated trees have survived. The survival of the flowers has meant that they have continued to be available for pollination by natural means and a normal fruit crop has been obtained. Moreover a large proportion of this crop may be high grade fruit.

The plant hormone substance may be a natural or synthetic material. Among such substances there may be mentioned indolyl acetic and butyric acids, beta-naphthoxy-acetic acid, alpha-naphthalene acetic acid, 2-methyl-4-chloro-phenoxyacetic acid and 2.4-dichloro-phenoxyacetic acid. Depending upon the form in which the composition is to be employed the plant hormone may be used as the free acid, in the form of a water-soluble salt such as the sodium, potassium, ammonium or ethanolamine salts or in the form of an ester such as the methyl, ethyl, n-propyl, iso-propyl or a butyl ester.

The vitamin K substance is either the naturally occurring substance or a material possessing the anti-haemorrhagic properties of vitamins K1 or K5. Vitamin K1 is 2-methyl-3-phytyl-1.4-naphthoquinone. An important material possessing the same properties is 2-methyl-1.4-naphthoquinone which may be employed as such or in the form of a functional derivative, for example, the reduced and acetylated material known as acetomenaphthone or a water-soluble functional derivative such as the sodium bisulphite compound, the tetraalkali metal 2-methyl-1.4-naphthahydroquinone diphosphates, the alkali metal 2-methyl-1.4-naphthoquinone disulphates, 2-methyl-1.4-naphthoquinone monohydrogen succinate and the acid disuccinic ester of 2-methyl-1.4-naphthahydroquinone. Vitamin K5 is 4-amino-2-methyl-1-naphthol. Such compounds appear to have a methyl group in the 2-position and a phenolic hydroxyl group or a doubly linked oxygen atom in the 1-position, the latter feature being characteristic of two tautomeric forms.

The substance having antipellagric activity may be nicotinic acid, a salt thereof such as an alkali metal or an ethanolamine salt, an ester such as ethyl or butyl nicotinate or nicotinamide.

Whilst any proportions can be employed for the three component mixtures a very convenient and preferred range is one mol of plant hormone to 1.0–2 mols of substance having vitamin K activity and 10–20 mols of substance having antipellagric action. A very useful mixture is 1 mol of plant hormone, 1.5 mols of substance having vitamin K activity and 14–15 mols of nicotinic acid or its amide.

The composition may be prepared in a variety of forms, for example, a water-soluble powder, a dusting powder, an organic solvent soluble mixture, an oil-soluble powder, a self-emulsifying composition, an emulsion or in tablet form. The choice of the specific ingredients depends upon the form desired and the proportion is to some extent dependent upon the response shown by the plants. Thus for a given number of mols of vitamin K compound or substance having antipellagric activity less mols of dichlorophenoxyacetic acid is used than alpha-naphthalene acetic acid.

The method of treatment which has been mainly employed is spraying and any of the above types of spraying compositions can be adopted. Interesting results have also been obtained by inserting tablets as hereinafter described and by direct application of a powder.

An aqueous solution or an emulsion may be sprayed on to trees and bushes by hand, machine or helicopter. In general other ingredients which may be required to be sprayed at the same time can be incorporated in the spraying mixture. Conveniently the spray should be made to such a dilution that it is sprayed at 400 gallons per acre without excessive amounts being received by the fruit bearing spurs. Suitable stages for application to various fruit-bearing trees are given in the following table, the stages being as defined in Bulletin No. 137 of the Ministry of Agriculture and Fisheries, London, England.

| Fruit Bearing Plant | Two Applications | Three Applications |
| --- | --- | --- |
| Apples | (a) Green cluster. (b) Pink bud. | (a) Green cluster. (b) Pink bud. (c) Petal fall. |
| Pears | (a) Green cluster. (b) White bud. | (a) Green cluster. (b) White bud. (c) Petal fall. |
| Plums | (a) Burst. (b) White bud. | (a) Burst. (b) White bud. (c) Cot split. |
| Cherries | (a) Burst. (b) White bud. | (a) Burst. (b) White bud. (c) Petal fall. |
| Citrus and Vines | Two applications before blossoming. | Two applications before blossoming and a third immediately after blossoming. |

Peaches and apricots should be treated at stages corresponding to those given for plums.

A water-soluble powder may be obtained by mixing (a) a water-soluble salt, for example, the sodium, potassium, ammonium or an alkanolamine salt of the plant hormone, (b) an alkali metal salt, for example, the sodium or potassium salt or an ammonium or an alkanolamine salt of nicotinic acid and (c) the sodium or potassium bisulphite compound of 2-methyl-1.4-naphthoquinone or a tetraalkali metal 2-methyl-1.4-naphthahydroquinone diphosphate.

The water-soluble ingredients may be used alone for solution or together with a water-soluble filler such as sodium chloride or sulphate. The following proportions are suitable:

Per cent
Mixture of plant hormone, vitamin K compound and antipellagra compound_ 10–100
Water-soluble filler _____ 90– 0

The following examples illustrate such compositions:

Example 1

0.5 lb. of 2.4-dichlorophenoxy acetic acid and 5 lbs. of nicotinic acid were dissolved in water. An aqueous dispersion was made therefrom incorporating 1.5 lbs. of 2-methyl-1.4-naphthoquinone and 7 lbs. of the sodium salt of sulphated lauryl alcohol. The dispersion was diluted to 14,000 gallons.

The dilute dispersion was sprayed on to part of an orchard of apples (variety: Lord Derby) in the second week of April. The orchard was subject to severe frost and a fruitlet count was taken in June. The treated trees bore an average of 419 fruitlets whilst the untreated trees only bore an average of 194 fruitlets.

*Example 2*

15 lbs. of the diethanolamine salt of beta-naphthoxy acetic acid
2.5 lbs. of tetra sodium 2-methyl-1.4-naphthohydroquinone disphosphate
5 lbs. of the diethanolamine salt of nicotinic acid.

These are prepared separately in solution, mixed and the whole diluted to 14,000 gallons prior to spraying.

A dusting powder may be made from the plant hormone or the sodium, potassium or ammonium salt thereof, 2-methyl-1.4-naphthoquinone, 2-methyl-4-amino-1-naphthol, the sodium or potassium bisulphite compound of the former or the tetraalkali metal 2-methyl-1.4-naphthahydroquinone phosphates, nicotinic acid or the sodium or potassium salt thereof or a lower alkyl ester thereof and a finely divided solid carrier such as kaolin, talc or bentonite.

The following proportions are suitable for dusting powders:

| | Per cent |
|---|---|
| Mixture of plant hormone vitamin K compound and antipellagra compound | 0.1–25 |
| Finely divided solid carrier | 99.9–75 |

The following example illustrates such compositions.

*Example 3*

1 lb. of indolyl butyric acid and
0.1 lb. of vitamin K5 (2 methyl-3-amino-1.4-naphthoquinone)
0.5 lb. of ethyl nicotinate are ground to a fine uniform powder with 100 lbs. of talc. This powder may be applied to bush apple trees (varieties: Bramley Seedling and Cox's Orange Pippin) at the average rate of 1 lb. per tree (some variation due to size of trees) by means of a powder spraying gun.

An organic solvent soluble powder is intended for the so-called aerosol application and may consist of the plant hormone in acid or ester form, 2-methyl-1.4-naphthoquinone and nicotinic acid or its amide. Such a mixture is intended to be dissolved in a low-boiling organic solvent such as acetone and may be used for fine spraying or for impregnating a carrier.

The following proportions are suitable for organic solvent soluble powders:

| | Per cent |
|---|---|
| Mixture of plant hormone, vitamin K compound and antipellagra compound | 20–100 |
| Solvent | 80– 0 |

The mixture may be in one container and the solvent in another for final preparation on the site. Suitable solvents are the volatile lower aliphatic esters of volatile monocarboxylic esters such as ethyl acetate, butyl acetate, ethyl propionate and ethyl butyrate and volatile ketones such as acetone and methyl ethyl ketone.

The following example illustrates such compositions:

*Example 4*

10 lbs. of ethyl indolyl acetate
0.2 lbs. of menaphthone
2.0 lbs. of nicotinamide are dissolved in 20 gallons of acetone. This solution is sprayed by means of aerosol equipment, the nozzle of the equipment being directed towards the fruit-bearing spurs.

An oil-soluble powder may consist of a mixture of plant hormone or an ester thereof, 2-methyl-1.4-naphthoquinone and nicotinic acid, nicotinamide or a lower alkyl ester of nicotinic acid.

The oil-soluble powder may be put up in one container with the oleaginous material in a second container for final preparation on the site. A suitable oil is castor oil which may be admixed with dimethyl or diethyl phthalate. When the composition is supplied dissolved in the oleaginous material it may be a 20% by weight or stronger solution.

*Example 5*

0.5 lb. of the methyl ester of 2-methyl-4-chlorophenoxy-acetic acid,
0.5 lb. of menaphthone
0.5 lb. of nicotinamide are dissolved in 3 lbs. of castor oil by heating. This mixture for use is further diluted with 300 gallons of white spirit and used for spraying at the rate of 10 gallons per acre by atomisation.

A self-emulsifying composition may consist of the ingredients of an oil-soluble powder dissolved in mineral oil, to which castor oil may have been added, together with an emulsifying agent soluble therein such as a rosin soap, Turkey red oil or sulphite cellulose liquor. This may be emulsified directly in water.

The following proportions are suitable for a self-emulsifying oil:

| | Per cent |
|---|---|
| Mixture of plant hormone, vitamin K compound and antipellagra compound | 10–30 |
| Castor oil or mineral oil | 40–60 |
| Emulsifying agent | 10–15 |
| Water | Balance |

The following example illustrates such compositions:

*Example 6*

1 lb. of ethyl 2:4-dichlorphenoxy acetate
0.5 lb. of menaphthone
0.5 lb. of butyl nicotinate
3 lbs. of castor oil
0.75 lb. of sulphite cellulose liquor from paper manufacture
0.25 lb. of water are heated together until a clear solution is obtained. This self-emulsifying oil may be diluted with 15,000 gallons of water and sprayed at the rate of 400 gallons per acre.

An emulsion may be prepared by dissolving an oil-soluble mixture in mineral oil or castor oil or a mixture thereof and emulsifying it into water, preferably in the presence of a wetting agent, such as a dialkyl ester of sulphosuccinic acid, a sulphated fatty alcohol, an alkylated naphthalene sulphonic acid, a taurine carrying a long chain substituent on the nitrogen atom or a petroleum sulphonate. The relative proportions are similar to those used in the self-emulsifying compositions.

The composition may also be prepared in tablet form containing small quantities of the ingredients in a form which is soluble in sap. These tablets may contain 2-methyl-1.4-naphthoquinone bisulphite compound or acetomenaphthone, the plant hormone in acid form or a water-soluble salt and nicotinic acid or nicotinamide together with an excipient such as starch.

The composition in tablet form may be inserted into small holes drilled into the trunks of trees, the hole extending inwardly further than the cambium layer and the holes then closed. Normally such holes are made about six inches below each main branch and the tablet inserted not later than the time when the sap begins to rise e. g. early March in Great Britain.

The following proportions are suitable for tablets:

| | Per cent |
|---|---|
| Mixture of plant hormone, vitamin K compound and antipellagra compound | 10–100 |
| Filler or excipient | 90– 0 |

An inert carbohydrate excipient such as starch is preferred.

The following example illustrates such compositions:

*Example 7*

Tablets were made up containing the following ingredients:

100 mgm. of starch
50 mgm. of nicotinamide
10 mgm. of acetomenaphthone
5 mgm. of alpha-naphthalene acetic acid These were inserted into a number of apple and plum trees including the varieties, Victoria Plum, Lord Derby, Bramley's Seedling and Cox's Orange Pippin apples. The insertions were made in February in accordance with the preceding indications.

For treating trees and plants in greenhouses and other enclosed spaces the invention may be utilised in the following way.

An aqueous or organic solvent solution of the composition in volatilisable form may be used to impregnate a carrier such as kieselguhr and the impregnated carrier packed into a compartment of a canister for use in producing an aerosol according to the method disclosed in British patent specification No. 621,894.

The composition of the invention in volatilisable form may be admixed with a solid combustible material such as glucose, sucrose, lactose, sorbitol or mannitol or a source of such materials such as molasses and a highly oxygenated inorganic compound from which oxygen is liberated at raised temperatures such as sodium and potassium chlorates and perchlorates and nitrates to produce a composition which may be shaped into forms such as cones and used for producing an aerosol according to the method disclosed in British patent specification No. 621,732.

The following example illustrates this form of the invention:

*Example 8*

The following ingredients are taken:

0.2 lb. of methyl alpha-naphthalene acetate
0.1 lb. of menaphthone
0.1 lb. of nicotinic acid
0.2 lb. of sodium nitrate
0.5 lb. of molasses
0.5 lb. of carbon black The above are kneaded together and shaped into cones weighing 1½ ozs. each. One or two of these cones are lit in a closed greenhouse, depending upon the size, and allowed to burn.

The concentration of active ingredients in the spray should be kept within the known safe limits for plant hormone applications. These range from about 5 parts per million for 2.4-dichlorophenoxy and 2-methyl-4-chlorophenoxyacetic acids up to about 100 parts per million for alpha-naphthalene acetic acid.

The amounts of vitamin K compound and compound having antipellagric activity used are not so critical and are usually several times those of the plant hormone materials. It will however be realised that the amounts to be applied are quite small. Such amounts are referred to as "limited amounts" in the appendant claims.

The following are typical of the results obtained:

A. Tablets having the composition set forth in Example 7 were inserted into the trunks of the varieties named in that example in February about 6 inches below each main branch and so that the tablets would be in the path of the rising sap according to the following

| Circumference, Inches | Holes | Distance apart of holes, Inches |
|---|---|---|
| 30 | 5 | 6 |
| 20 | 4 | 5 |
| 10 | 3 | 4 |

The trees were in a number of orchards and were subject to varying degrees of frost. On an average the blossom on the treated trees sustained only half the frost damage suffered by the untreated controls.

B. The mixture of Example 1 was used upon a site in Norfolk at the dilution specified. Apple trees of the variety Cox's Orange Pippin were treated at the average rate of 4 gallons of spray per tree. The treatment was carried out twice viz., on 13th and 27th April. On 16th April 10 degrees of frost was experienced which damaged 24% of the flowers on the controls and only 17% on the treated trees. Blossom was classed as damaged if the style was turned brown. Subsequently fruitlet counts were made and showed 3693 per 10 treated trees and 1186 per 10 control trees. The usual drop was experienced in June. The final harvest was 39 bushels of apples from each 30 treated trees compared with 28 bushels from each 30 control trees.

C. The mixture of Example 1 was used as another site in Norfolk at the dilution specified with apples of the variety Bramley's Seedling. Applications were made upon 2nd and 12th April. The amount per tree was about double that for Cox's Orange Pippin. On this site there was no appreciable frost and there was no substantial difference in the fruitlet count. The crop per 30 treated trees was 17.7 bushels as compared with 15.3 bushels on the controls i. e. about 15% higher. The apples from the treated trees contained 30% of apples over 2.5 inches whilst those from the control trees contained about 20% over that size.

D. On a site in Sweden 0.25 hectare of raspberry canes were sprayed twice with an aqueous solution containing 20 p. p. m. of sodium alpha-naphthalene acetate, 10 p. p. m. of menaphthone sodium bisulphite compound, 10 p. p. m. of nicotinamide and 1000 p. p. m. of a non-ionic wetting agent. The first spraying was at the green bud stage and the second when substantially all the flowers had opened. Three days after the second application there was severe wind frost. The blooms were inspected and those whose styles had turned brown were classed as damaged. On control plants 85% of the blooms were damaged whereas on the treated ones only 23% were damaged.

When the damage from frost is not severe and there are more than sufficient fruitlets available to grow on the subsequent history of the plant follows the normal seasonal routine (including fruit drop) but in a number of cases it has been noted that a much higher proportion of the crop is of market grade. This has been noted in some field trials in which the yield from the treated trees has been a little less than from controls. There is obviously more than one possible effect. It is believed that not only does the treatment outlined increase the resistance of trees to frost but that it helps them to recover more rapidly from the effect of frost. Such an effect cannot of course be demonstrated statistically. The fruits mature normally.

It will be understood that the dry compositions in accordance with the invention may be prepared as a fully compounded mixture but that in certain cases it may be desirable and more convenient to package two or more ingredients ready mixed in one container whilst one or more other ingredients are in a separate compartment for dry mixing prior to use or for separate solution in the liquid carrier medium in the manner outlined in the above specific examples.

In certain cases the ingredients for making one or more of the components may be mixed or packaged separately. Thus to produce a water-soluble salt of a plant hormone or of nicotinic acid the acid and a salt of a weak or easily displaced acid may be supplied, for example, an alkali metal carbonate or bicarbonate. To form a water-soluble derivative of the vitamin K compound the components for forming such compound in solution may be supplied for example, 2-methyl-1.4-naphthoquinone and sodium or potassium bisulphite. It is thus within the purview of the invention to provide the components from which one or more of the ingredients of the final composition may be readily produced shortly before use, especially insofar as providing a water-soluble form is concerned.

The invention is of especial importance in relation to such fruits as apples, pears and plums and in reducing frost damage to berry fruits such as raspberries and strawberries. Indications have however also been obtained that fruiting trees usually associated with warmer climates, such as citrus, can also be protected.

Reference is made to our companion copending applications Serial Nos. 207,241 and 207,242, both filed January 22, 1951, in which there are disclosed and claimed compositions and methods for reducing the loss of crop by use of mixtures of a plant hormone with either a substance having antipellagric activity or a substance having vitamin K activity.

What we claim is:

1. A composition for reducing the loss of crop by frost damage to a fruit bearing plant which comprises, as its essential ingredients, a plant hormone, a substance having antipellagric activity and a substance having vitamin K activity.

2. A composition for reducing the loss of crop by frost damage to a fruit bearing plant which comprises, as its essential ingredients, a plant hormone, a substance having antipellagric activity and a substance having vitamin K activity the combined weight of said plant hormone and of said substance having vitamin K activity being at least 5% of the total weight of the active ingredients of said composition.

3. A composition for reducing the loss of crop by frost damage to a fruit bearing plant which comprises, as its essential ingredients, a plant hormone, a substance having antipellagric activity, a substance having vitamin K activity and a finely divided solid carrier.

4. A composition for reducing the loss of crop by frost damage to a fruit bearing plant which comprises, as its essential ingredients, a plant hormone, a substance having antipellagric activity, a substance having vitamin K activity and a liquid carrier.

5. A composition for reducing the loss of crop by frost damage to a fruit bearing plant which comprises, as its essential ingredients, a plant hormone, a substance having antipellagric activity and a substance having vitamin K activity said composition containing 1 mol of plant hormone for each 1-2 mols of substance having vitamin K activity and 10-20 mols of substance having antipellagric activity.

6. A composition for reducing the loss of crop by frost damage to a fruit bearing plant which comprises, as its essential ingredients, a plant hormone in water-soluble form, a substance having antipellagric activity in water-soluble form and a substance having vitamin K activity in water-soluble form.

7. A composition for reducing the loss of crop by frost damage to a fruit bearing plant which comprises, as its essential ingredients, a water-soluble salt of beta-naphthoxyacetic acid, a substance having antipellagric activity in water-soluble form and a water-soluble form of 2-methyl-1.4-naphthoquinone.

8. A composition for reducing the loss of crop by frost damage to a fruit bearing plant which comprises, as its essential ingredients, a water-soluble salt of alpha-naphthalene acetic acid, a substance having antipellagric activity in water-soluble form and a water-soluble form of 2-methyl-1.4-naphthoquinone.

9. A composition for reducing the loss of crop by frost damage to a fruit bearing plant which comprises, as its essential ingredients, a water-soluble salt of 2.4-dichlorophenoxyacetic acid, a substance having antipellagric activity in water-soluble form and a water-soluble form of 2-methyl-1.4-naphthoquinone.

10. A composition for reducing the loss of crop by frost damage to a fruit bearing plant which comprises, as its essential ingredients, a water-soluble salt of 2-methyl-4-chlorophenoxyacetic acid, a substance having antipellagric activity in water-soluble form and a water-soluble form of 2-methyl-1.4-naphthoquinone.

11. A tablet for reducing the loss of crop by frost damage to fruit bearing plants which comprises as its essential ingredients, a plant hormone, a substance having antipellagric activity and a substance having vitamin K activity, said hormone and said substances all being present in sap-soluble form.

12. A tablet for reducing the loss of crop by frost damage to fruit bearing plants which comprist a plant hormone, a substance having antipellagric activity and a substance having vitamin K activity and an excipient, said hormone and said substances all being present in sap-soluble form.

13. A combustible mass for reducing the loss of crop by frost damage to a fruit bearing plant which comprises a plant hormone in volatilisable form, a compound having antipellagric activity in volatilisable form, a compound having vitamin K activity in volatilisable form, a highly oxygenated inorganic compound from which oxygen is liberated at raised temperatures and at least one solid material which will support combustion.

14. A method of reducing the loss of crop by frost damage to a fruit bearing plant which comprises applying to the fruit bearing spurs of said plant at any time from the green bud stage to the fruitlet stage limited amounts of a plant hormone, a substance having vitamin K activity and a substance having antipellagric activity whereby normal development of an enhanced proportion of fruits takes place.

15. A method of reducing the loss of crop by frost damage to a fruit bearing plant which comprises applying to the fruit bearing spurs of said plant at any time from the green bud stage to the fruitlet stage, limited amounts of a dilute aqueous solution of a plant hormone in water-soluble form, a substance having antipellagric activity in water-soluble form and a substance having vitamin K activity in water-soluble form whereby normal development of an enhanced proportion of fruits takes place.

16. A method of reducing the loss of crop by frost damage to a fruit bearing plant which comprises applying to the fruit bearing spurs of said plant at any time from the green bud stage to the fruitlet stage, limited amounts of a dilute aqueous solution of a water-soluble salt of beta-naphthoxyacetic acid, a substance having antipellagric activity in water-soluble form and a water-soluble form of 2-methyl-1.4-naphthoquinone whereby normal development of an enhanced proportion of fruits takes place.

17. A method of reducing the loss of crop by frost damage to a fruit bearing plant which comprises applying to the fruit bearing spurs of said plant at any time from the green bud stage to the fruitlet stage, limited amounts of a dilute aqueous solution of a water-soluble salt of alpha-naphthalene acetic acid, a substance having antipellagric activity in water-soluble form and a water-soluble form of 2-methyl-1.4-naphthoquinone whereby normal development of an enhanced proportion of fruits takes place.

18. A method of reducing the loss of crop by frost damage to a fruit bearing plant which comprises applying to the fruit bearing spurs of said plant at any time from the green bud stage to the fruitlet stage, limited amounts of a dilute aqueous solution of a water-soluble salt of 2.4-dichlorophenoxyacetic acid, a substance having antipellagric activity in water-soluble form and a water-soluble form of 2-methyl-1.4-naphthoquinone whereby normal development of an enhanced proportion of fruits takes place.

19. A method of reducing the loss of crop by frost damage to a fruit bearing plant which comprises applying to the fruit bearing spurs of said plant at any time from the green bud stage to the fruitlet stage, limited amounts of a dilute aqueous solution of a water-soluble salt of 2-methyl-4-chlorophenoxyacetic acid, a substance having antipellagric activity in water-soluble form and a water-soluble form of 2-methyl-1.4-naphthoquinone whereby normal development of an enhanced proportion of fruits takes place.

20. A method of reducing the loss of crop by frost damage to a fruit bearing plant which comprises inserting into the trunk of said plant beneath the cambium layer and prior to sap rise limited amounts of a plant hormone, a substance having antipellagric activity and a substance having vitamin K activity, said plant hormone and both of said substances being in sap-soluble form whereby normal development of an enhanced proportion of fruits takes place.

PETER PAUL HOPF.
GEOFFREY LEIGH HEY.

No references cited.